(12) United States Patent
Immer et al.

(10) Patent No.: US 12,280,538 B2
(45) Date of Patent: Apr. 22, 2025

(54) ADDITIVE MANUFACTURING METHODS AND SYSTEMS WITH TWO BEAMS TRAVELING ALONG OPPOSING, WOBBLING PATHS

(71) Applicant: General Electric Company, Schenectady, NY (US)

(72) Inventors: Christopher Darby Immer, Niskayuna, NY (US); Robert John Filkins, Niskayuna, NY (US); Victor Petrovich Ostroverkhov, Ballston Lake, NY (US); Michael Robert Tucker, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/865,493

(22) Filed: Jul. 15, 2022

(65) Prior Publication Data

US 2024/0017482 A1    Jan. 18, 2024

(51) Int. Cl.
| | |
|---|---|
| *B29C 64/153* | (2017.01) |
| *B22F 10/28* | (2021.01) |
| *B22F 12/45* | (2021.01) |
| *B28B 1/00* | (2006.01) |
| *B29C 64/268* | (2017.01) |
| *B29C 64/282* | (2017.01) |

(Continued)

(52) U.S. Cl.
CPC ............ *B29C 64/153* (2017.08); *B22F 10/28* (2021.01); *B22F 12/45* (2021.01); *B28B 1/001* (2013.01); *B29C 64/268* (2017.08); *B29C 64/282* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 4,370,141 A | * | 1/1983 | Lee .................. D01F 9/225 8/115.52 |
| 4,917,484 A | | 4/1990 | Heinz |

(Continued)

FOREIGN PATENT DOCUMENTS

| | | |
|---|---|---|
| CN | 112496339 A | 3/2021 |
| DE | 102017200793 A1 | 1/2018 |

(Continued)

OTHER PUBLICATIONS

JP-2018187677-A translation (Year: 2023).*

(Continued)

*Primary Examiner* — Jeffrey M Wollschlager
*Assistant Examiner* — Guy F Mongelli
(74) *Attorney, Agent, or Firm* — Dority & Manning, P.A.

(57) ABSTRACT

Methods of additively manufacturing a three-dimensional object include irradiating a first build plane region using a first energy beam, irradiating a second build plane region using a second energy beam, and irradiating an interlace region between the first build plane region and the second build plane region. Irradiating the interlace region comprises directing the first energy beam along a first oscillating path and directing the second energy beam along a second oscillating path intersecting and overlapping with the first oscillating path.

17 Claims, 6 Drawing Sheets

(51) Int. Cl.
   B33Y 10/00 (2015.01)
   B33Y 30/00 (2015.01)

(56) References Cited

U.S. PATENT DOCUMENTS

| | | | |
|---|---|---|---|
| 5,550,669 | A | 8/1996 | Patel |
| 5,699,589 | A * | 12/1997 | Ripley .................... D01G 9/14 |
| | | | 8/115.52 |
| 5,990,444 | A * | 11/1999 | Costin ................ D06M 10/005 |
| | | | 219/121.61 |
| 6,252,196 | B1 * | 6/2001 | Costin .................... D06P 5/001 |
| | | | 219/121.61 |
| 6,756,561 | B2 | 6/2004 | McGregor et al. |
| 6,807,892 | B2 | 10/2004 | Biegelsen et al. |
| 7,188,831 | B2 | 3/2007 | Coppoolse |
| 7,899,569 | B2 | 3/2011 | Holzwarth |
| 8,034,279 | B2 | 10/2011 | Dimter et al. |
| 8,752,969 | B1 | 6/2014 | Kane et al. |
| 9,527,246 | B2 | 12/2016 | Wiesner et al. |
| 9,878,497 | B2 | 1/2018 | Schwarze et al. |
| 10,035,188 | B2 | 7/2018 | Weilhammer et al. |
| 10,337,335 | B2 | 7/2019 | Pavlov et al. |
| 10,372,110 | B2 | 8/2019 | Jagdale et al. |
| 10,399,183 | B2 | 9/2019 | Dallarosa et al. |
| 10,406,633 | B2 | 9/2019 | Crear et al. |
| 10,471,665 | B1 | 11/2019 | Marshall, Jr. et al. |
| 10,661,514 | B2 | 5/2020 | Talgorn et al. |
| 10,751,835 | B2 | 8/2020 | Grapov et al. |
| 10,786,865 | B2 | 9/2020 | Hellestam |
| 10,814,429 | B2 | 10/2020 | Roychowdhury et al. |
| 10,821,551 | B2 | 11/2020 | Roychowdhury et al. |
| 10,912,211 | B2 | 2/2021 | Range et al. |
| 11,072,113 | B2 | 7/2021 | Zeulner |
| 11,135,680 | B2 | 10/2021 | Wuest et al. |
| 11,161,201 | B2 | 11/2021 | Ostroverkhov et al. |
| 11,344,978 | B2 | 5/2022 | DeMuth et al. |
| 2002/0179580 | A1 * | 12/2002 | Costin ................ D06M 10/005 |
| | | | 219/121.68 |
| 2006/0028400 | A1 * | 2/2006 | Lapstun ............. G02B 27/0093 |
| | | | 345/8 |
| 2007/0147445 | A1 * | 6/2007 | Ishaaya ..................... H01S 3/10 |
| | | | 372/29.022 |
| 2011/0311389 | A1 | 12/2011 | Ryan et al. |
| 2012/0133080 | A1 | 5/2012 | Moussa et al. |
| 2012/0267347 | A1 | 10/2012 | Arjakine et al. |
| 2013/0105447 | A1 * | 5/2013 | Haake .................. B23K 26/144 |
| | | | 219/76.14 |
| 2013/0216836 | A1 | 8/2013 | Grebe et al. |
| 2013/0263977 | A1 | 10/2013 | Rickenbacher et al. |
| 2014/0140882 | A1 | 5/2014 | Syassen |
| 2014/0348691 | A1 * | 11/2014 | Ljungblad ............... B22F 10/28 |
| | | | 419/53 |
| 2015/0210013 | A1 | 7/2015 | Teulet |
| 2015/0231825 | A1 * | 8/2015 | Swartz ..................... B32B 1/00 |
| | | | 428/156 |
| 2015/0375340 | A1 * | 12/2015 | Cui ........................ B29C 64/153 |
| | | | 428/221 |
| 2016/0101470 | A1 * | 4/2016 | Kamakura ............ B29C 64/153 |
| | | | 425/78 |
| 2017/0173883 | A1 | 6/2017 | Gray et al. |
| 2017/0197278 | A1 * | 7/2017 | Garry ..................... B29C 64/277 |
| 2017/0304894 | A1 | 10/2017 | Buller |
| 2018/0099331 | A1 | 4/2018 | Hoebel et al. |
| 2018/0111319 | A1 * | 4/2018 | Brezoczky ............. B29C 64/255 |
| 2018/0207722 | A1 | 7/2018 | Feldmann et al. |
| 2018/0250744 | A1 | 9/2018 | Symeonidis et al. |
| 2018/0304406 | A1 | 10/2018 | Roerig et al. |
| 2018/0326536 | A1 | 11/2018 | Mentzel et al. |
| 2018/0345405 | A1 | 12/2018 | Ostroverkhov et al. |
| 2019/0017757 | A1 | 1/2019 | Seeholzer et al. |
| 2019/0091935 | A1 | 3/2019 | Weichsellbaumer et al. |
| 2019/0217542 | A1 | 7/2019 | Pontiller-Schymura et al. |
| 2019/0232427 | A1 | 8/2019 | Roychowdhury et al. |
| 2019/0232428 | A1 | 8/2019 | Roychowdhury et al. |
| 2019/0291348 | A1 * | 9/2019 | Khairallah .............. B33Y 30/00 |
| 2020/0061917 | A1 * | 2/2020 | Osborn ................... B33Y 30/00 |
| 2020/0223139 | A1 | 7/2020 | Hunze et al. |
| 2020/0276667 | A1 | 9/2020 | Filkins et al. |
| 2020/0353678 | A1 | 11/2020 | Yeoh |
| 2021/0187830 | A1 | 6/2021 | McCarthy et al. |
| 2021/0316409 | A1 | 10/2021 | DeMuth et al. |
| 2022/0080526 | A1 * | 3/2022 | Kameda ............. B23K 26/0736 |
| 2022/0080661 | A1 * | 3/2022 | Kopatsch ................. B22F 10/85 |
| 2022/0168813 | A1 | 6/2022 | Dardis et al. |
| 2022/0305561 | A1 | 9/2022 | Helm |

FOREIGN PATENT DOCUMENTS

| | | | | |
|---|---|---|---|---|
| JP | 2018187677 A | * | 11/2018 | ............ B22F 3/1055 |
| WO | WO2021229172 A1 | | 11/2021 | |
| WO | WO-2021237163 A1 | * | 11/2021 | ............ A61L 27/025 |
| WO | WO-2021237984 A1 | * | 12/2021 | .............. B22F 10/00 |

OTHER PUBLICATIONS

Shi et al., Microstructural Control in Metal Laser Powder Bed Fusion Additive Manufacturing Using Laser Beam Shaping Strategy, Acta Materialia, vol. 184, Feb. 1, 2020, pp. 284-305 https://doi.org/10.1016/j.actamat.2019.11.053.

SLM Solutions, NXG XII 600, 10 Pages Retrieved Jan. 5, 2022 from https://www.slm-pushing-the-limits.com/specs#optical-system.

Tenbrock et al., Influence of Keyhole and Conduction Mode Melting for Top-Hat Shaped Beam Profiles in Laser Powder Bed Fusion, Journal of Materials Processing Technology, vol. 278, Apr. 2020, 10 Pages. https://doi.org/10.1016/j.imatprotec.2019.116514.

Tumkur et al., Nondiffractive Beam Shaping for Enhanced Optothermal Control in Metal Additive Manufacturing, Science Advances, vol. 17, Issue 38, Sep. 15, 2021, 12 Pages. https://www.science.org/doi/pdf/10.1126/sciady.abg9358.

* cited by examiner

ADDITIVE MANUFACTURING METHODS AND SYSTEMS WITH TWO BEAMS TRAVELING ALONG OPPOSING, WOBBLING PATHS

FEDERALLY SPONSORED RESEARCH

This invention was made with government support under contract number FA8650-20-2-5700 awarded by the Department of Defense. The U.S. government may have certain rights in the invention.

FIELD

The present disclosure relates to additive manufacturing methods and systems, such as additive manufacturing methods and systems using multiple energy beams.

BACKGROUND

Three-dimensional objects may be additively manufactured using a variety of methods and systems. For example, additive manufacturing may involve a powder bed fusion process in which one or more energy beams are directed onto a powder bed to consolidate melt, fuse, or sinter sequential layers of build material such as powder material. The properties of the three-dimensional object formed by consolidating the powder material depend at least in part on one or more parameters of the energy beam. Additionally, one or more parameters of an energy beam impact operating parameters such as processing speed of the additive manufacturing process.

In some additive manufacturing systems, multiple energy beams may be used to consolidate multiple build plane regions in the build plane. The multiple energy beams may be initiated from one or more energy beam sources and independently controlled via respective optical assemblies. By consolidating multiple build plane regions via different energy beams, build time of the three-dimensional object may be reduced. For example, two adjacent build plane regions may be consolidated in parallel (i.e., at least partially simultaneously) with one another to increase the overall consolidation rate of the build material.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
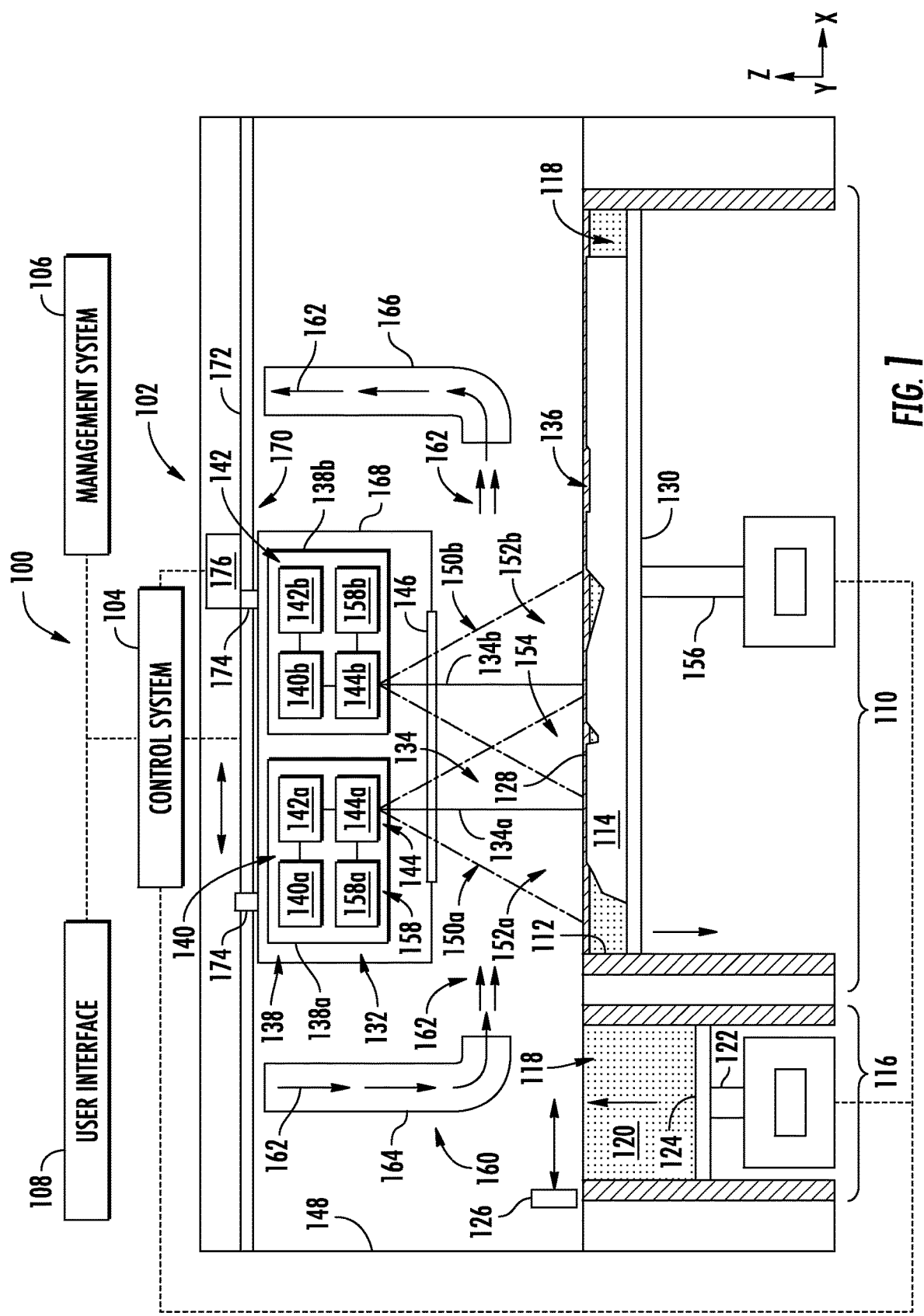
FIG. 1 schematically depicts an exemplary additive manufacturing system in accordance with one or more exemplary aspects of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, an electron beam melting (EBM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include ultra-high-temperature ceramics, or precursors for ultra-high-temperature ceramics, such as polymeric precursors. Each successive layer may be, for example, between about 10 μm and 200 μm, although the thickness may be determined based on any number of parameters and may be any suitable size. Moreover, the additive manufacturing process described herein may be used for forming any type of suitable component. For example, the component formed using the additive manufacturing process described herein may comprise one or more turbine components such as turbine blades, shrouds, nozzles, heat shields, or vanes.

As used herein, the term "build plane" refers to a plane defined by a surface upon which an energy beam impinges to selectively irradiate and thereby consolidate powder material during an additive manufacturing process. Generally, the surface of a powder bed defines the build plane. During irradiation of a respective layer of the powder bed, a previously irradiated portion of the respective layer may define a portion of the build plane. Prior to distributing powder material across a build module, a build plate that supports the powder bed generally defines the build plane.

As used herein, the term "consolidate" or "consolidating" refers to solidification of build material (e.g., powder material) as a result of irradiating the build material, including by way of melting, fusing, sintering, or the like. such that multiple separate pieces of build material (e.g., multiple individual pieces of powder material) join together into a single structure.

As used herein, the term "unconsolidated" refers to separate pieces of material than are not bonded or otherwise joined to one another, such as separate pieces of loose powder.

It is also understood that terms such as "top", "bottom", "outward", "inward", and the like are words of convenience and are not to be construed as limiting terms.

As used herein, the terms "first", "second", and "third" may be used interchangeably to distinguish one component from another and are not intended to signify location or importance of the individual components.

The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to additive manufacturing methods and systems using multiple energy beams. Energy beams in such systems and methods may be continuously, periodically, or intermittently aligned to promote consolidation accuracy of the respective build plane regions. For example, proper alignment of the energy beams may ensure smooth and consistent transitions where one build plane region abuts another build plane region. Moreover, adjacent build plane regions may include an interlace region where the respective build plane regions partially overlap with one another. This interlace region may promote consistent consolidation across a larger build area of the three-dimensional object despite different energy beams consolidating different build plane regions. However, proper transitioning between two adjacent build plane regions can still be susceptible to deviations, including along the outer contour of the three-dimensional object, such as in the case of potential misalignment of one or more energy beams.

Accordingly, alternative additive manufacturing methods and systems would be welcomed in the art, including additive manufacturing methods and systems that provide stitching between respective build plane regions.

The presently disclosed subject matter will now be described in further detail. FIG. 1 schematically depicts an additive manufacturing system 100. The additive manufacturing system 100 may include one or more additive manufacturing machines 102. It will be appreciated that the additive manufacturing system 100 and additive manufacturing machine 102 shown in FIG. 1 is provided by way of example and not to be limiting. In fact, the subject matter of the present disclosure may be practiced with any additive manufacturing system 100 and additive manufacturing machine 102 without departing from the scope of the present disclosure. As shown, the one or more additive manufacturing machines 102 may include a control system 104. The control system 104 may be included as part of the additive manufacturing machine 102 or the control system 104 may be associated with the additive manufacturing machine 102. The control system 104 may include componentry integrated as part of the additive manufacturing machine 102 or componentry that is provided separately from the additive manufacturing machine 102. Various componentry of the control system 104 may be communicatively coupled to various componentry of the additive manufacturing machine 102.

The control system 104 may be communicatively coupled with a management system 106 or a user interface 108. The management system 106 may be configured to interact with the control system 104 in connection with enterprise-level operations pertaining to the additive manufacturing system 100. Such enterprise level operations may include transmitting data from the management system 106 to the control system 104 or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or three-dimensional objects 114 may be additively manufactured. An additive manufacturing machine 102 may include a powder module 116 that contains a supply of build material 118 (e.g., powder material) housed within a supply chamber 120. The build module 110 or the powder module 116 may be provided in the form of modular containers configured to be installed into and removed from the additive manufacturing machine 102 such as in an assembly-line process. Additionally, or in the alternative, the build module 110 or the powder module 116 may define a fixed componentry of the additive manufacturing machine 102.

The powder module 116 contains a supply of build material 118 housed within a supply chamber 120. The powder module 116 includes a powder piston 122 that elevates a powder floor 124 during operation of the additive manufacturing machine 102. As the powder floor 124 elevates, a portion of the build material 118 is forced out of the powder module 116. A recoater 126 such as a blade or roller sequentially distributes thin layers of build material 118 across a build plane 128 above the build module 110. A build platform 130 supports the sequential layers of build material 118 distributed across the build plane 128. A build platform 130 may include a build plate (not shown) secured thereto and upon which a three-dimensional object 114 may be additively manufactured.

The additive manufacturing machine 102 includes an energy beam system 132 configured to generate one or more of energy beams 134 and to direct the energy beams 134 onto the build plane 128 to selectively solidify respective portions of the powder bed 136 defining the build plane 128. The energy beams 134 may be laser beams or beams from any other suitable energy source, such as LEDs or other light sources, and so forth. As the energy beams 134 selectively melt or fuse the sequential layers of build material 118 that define the powder bed 136, the three-dimensional object 114 begins to take shape. The one or more energy beams 134 or laser beams may include electromagnetic radiation having any suitable wavelength or wavelength range, such as a wavelength or wavelength range corresponding to infrared light, visible light, or ultraviolet light, or a combination thereof.

Typically, with a DMLM, EBM, or SLM system, the build material 118 is fully melted, with respective layers being melted or re-melted with respective passes of the energy beams 134. With DMLS or SLS systems, typically the layers of build material 118 are sintered, fusing particles of build material 118 to one another generally without reaching the melting point of the build material 118. The energy beam system 132 may include componentry integrated as part of the additive manufacturing machine 102 or componentry that is provided separately from the additive manufacturing machine 102.

The energy beam system 132 may include one or more irradiation devices 138 configured to generate a plurality of energy beams 134 and to direct the energy beams upon the build plane 128. An energy beam system 132 may include a plurality of irradiation devices 138, such as a first irradiation device 138a and a second irradiation device 138b. The one or more irradiation devices 138 may respectively include an energy beam source 140 (e.g., first energy beam source 140a and second energy beam source 140b), an optical assembly 142 (e.g., first optical assembly 142a and second optical assembly 142b), and a scanner 144 (e.g., first scanner 144a and second scanner 144b). The optical assembly 142 may include a plurality of optical elements configured to direct the energy beam onto the build plane 128. The optical assembly 142 may include one or more optical elements, such as lenses through which an energy beam may be transmitted along an optical path from the energy beam source to the build plane. By way of example, an optical assembly 142 may include one more focusing lenses that focus an energy beam 134 on a build plane 128. A scanner 144 may include a galvo scanner, an electro-optic modulator, an acousto-optic modulator, a piezo-driven mirror, or the like. Additionally, or in the alternative, the energy beam system 132 may include a window 146, such as a protective glass, that separates one or more components of the energy beam system 132 from the environment of a process chamber 148 within which build material 118 is irradiated by the one or more energy beams 134 to additively manufacture a three-dimensional object 114.

The window 146 may prevent contaminants from fumes associated with the additive manufacturing process, such as powder material, dust, soot, residues, vapor, byproducts, and the like, from coming into contact with sensitive components of an energy beam system 132. Accumulation of contaminants upon various optical elements of an optical assembly 142 may adversely affect operation of the energy beam system 132 or quality metrics associated with an energy beam system. Additionally, or in the alternative, such contaminants may cause damage to various optical elements of an optical assembly 142.

As shown in FIG. 1, the energy beam system 132 includes a first irradiation device 138a and a second irradiation device 138b. Additionally, or in the alternative, an energy beam system 132 may include any number of additional irradiation devices such as three, four, six, eight, ten, or more irradiation devices, and such irradiation devices may respectively include an optical assembly 142. The plurality of irradiation devices 138 may be configured to respectively generate one or more energy beams that are respectively scannable within a scan field incident upon at least a portion of the build plane 128 to selectively consolidate the portions of the build material 118 that are to become part of the three-dimensional object 114. For example, the first irradiation device 138a may generate a first energy beam 134a that is scannable within a first scan field 150a incident upon at least a first build plane region 152a. The second irradiation device 138b may generate a second energy beam 134b that is scannable within a second scan field 150b incident upon at least a second build plane region 152b. The first scan field 150a and the second scan field 150b may overlap such that the first build plane region 152a scannable by the first energy beam 134a overlaps with the second build plane region 152b scannable by the second energy beam 134b. The overlapping portion of the first build plane region 152a and the second build plane region 152b may sometimes be referred to as an interlace region 154. Portions of the powder bed 136 to be irradiated within the interlace region 154 may be irradiated by the first energy beam 134a or the second energy beam 134b, or a combination thereof. While the powder bed 136 to be irradiated is exemplary illustrated as being irradiated by the first energy beam 134a or the second energy beam 134b, it is appreciated that any number of energy beams 134 may additionally or alternatively be utilized for irradiating the build plane 128, including one or more respective interlace regions 154 between respective energy beams 134 in accordance with the present disclosure.

To irradiate a layer of the powder bed 136, the one or more irradiation devices 138 (e.g., the first irradiation device 138a and the second irradiation device 138b) respectively direct the plurality of energy beams 134 beams (e.g., the first energy beam 134a and the second energy beam 134b) across the respective portions of the build plane 128 (e.g., the first build plane region 152a and the second build plane region 152b) to selectively consolidate the portions of the build material 118 that are to become part of the three-dimensional object 114. The one or more energy beams 134 may become incident upon the build plane 128 defined by the powder bed 136, for example, after passing through one or more optical elements of the optical assembly 142 or through a window 146 of the energy beam system 132. As sequential layers of the powder bed 136 are consolidated, a build piston 156 gradually lowers the build platform 130 to make room for sequential layers of build material 118. As sequential layers of build material 118 are applied across the build plane 128, the next sequential layer of build material 118 defines the surface of the powder bed 136 coinciding with the build plane 128. Sequential layers of the powder bed 136 may be selectively consolidated until a completed object 114 has been additively manufactured. In some aspects of the disclosure, an additive manufacturing machine may utilize an overflow module (not shown) to capture excess build material 118. Additionally, or in the alternative, excess build material 118 may be redistributed across the build plane 128 when applying a next sequential layer of build material 118. It will be appreciated that other systems may be provided for handling the build material 118, including different powder supply systems or excess powder recapture systems. The subject matter of the present disclosure may be practiced with any suitable additive manufacturing machine without departing from the scope hereof.

Still referring to FIG. 1, an additive manufacturing machine 102 may include an imaging system 158 (e.g., first imaging system 158a and second imaging system 158b) configured to monitor one or more operating parameters of an additive manufacturing machine 102, one or more parameters of an energy beam system 132, or one or more operating parameters of an additive manufacturing process. The imaging system may have a calibration system configured to calibrate one or more operating parameters of an additive manufacturing machine 102 or of an additive manufacturing process. The imaging system 158 may be a melt pool monitoring system. The one or more operating parameters of the additive manufacturing process may include operating parameters associated with additively manufacturing a three-dimensional object 114. The imaging system 158 may be configured to detect an imaging beam such as an infrared beam from a laser diode or a reflected portion of an energy beam (e.g., a first energy beam 134a or a second energy beam 134b).

An energy beam system 132 or an imaging system 158 may include one or more detection devices. The one or more detection devices may be configured to determine one or more parameters of an energy beam system 132, such as one or more parameters associated with irradiating the sequential layers of the powder bed 136 based at least in part on an assessment beam detected by the imaging system 158. One or more parameters associated with consolidating the sequential layers of the powder bed 136 may include irradiation parameters or object parameters, such as melt pool monitoring parameters. The one or more parameters determined by the imaging system 158 may be utilized, for example, by the control system 104, to control one or more operations of the additive manufacturing machine 102 or of the additive manufacturing system 100. The one or more detection devices may be configured to obtain assessment data of the build plane 128 from a respective assessment beam. An exemplary detection device may include a camera, an image sensor, a photo diode assembly, or the like. For example, a detection device may include charge-coupled device (e.g., a CCD sensor), an active-pixel sensor (e.g., a complementary metal-oxide semiconductor (CMOS) sensor), a quanta image device (e.g., a QIS sensor), or the like. A detection device may additionally include a lens assembly configured to focus an assessment beam along a beam path to the detection device. An imaging system 158 may include one or more imaging optical elements (not shown), such as mirrors, beam splitters, lenses, and the like, configured to direct an assessment beam to a corresponding detection device.

In addition, or in the alternative, to determine parameters associated with irradiation the sequential layers of the powder bed 136, the imaging system 158 may be configured to perform one or more calibration operations associated with an additive manufacturing machine 102, such as a calibration operation associated with the energy beam system 132, one or more irradiation devices 138 or components thereof, or the imaging system 158 or components thereof. The imaging system 158 may be configured to project an assessment beam and to detect a portion of the assessment beam reflected from the build plane 128. The assessment beam may be projected by an irradiation device 138 or a separate beam source associated with the imaging system 158. Additionally, or in the alternative, the imaging system 158 may be configured to detect an assessment beam that includes radiation emitted from the build plane 128, such as radiation from an energy beam 134 reflected from the powder bed 136 or radiation emitted from a melt pool in the powder bed 136 generated by an energy beam 134 or radiation emitted from a portion of the powder bed 136 adjacent to the melt pool. The imaging system 158 may include componentry integrated as part of the additive manufacturing machine 102 or componentry that is provided separately from the additive manufacturing machine 102. For example, the imaging system 158 may include componentry integrated as part of the energy beam system 132. Additionally, or in the alternative, the imaging system 158 may include separate componentry, such as in the form of an assembly, that can be installed as part of the energy beam system 132 or as part of the additive manufacturing machine 102.

Still referring to FIG. 1, in some aspects of the disclosure, an inertization system 160 may supply a flow of inert process gas 162 to one or more regions the process chamber 148, such as a region between the energy beam system 132 and the powder bed 136. The flow of inert process gas 162 may remove fumes from the process chamber 148 or to reduce the tendency of fumes to interfere with the energy beams 134 used to irradiate the build material 118. Such fumes may present in the form of a plume emanating from a consolidation zone where an energy beam 134 becomes incident upon the powder bed 136 and may sometimes be referred to as a fume plume. A fume plume may include build material, dust, soot, residues, vapors, byproducts, and the like. The flow if inert process gas 162 may also reduce the tendency of contaminants from fumes to deposit on the window 146, optical elements of the optical assembly 142, or other components of the energy beam system 132. The inertization system 160 may provide a directional flow of inert process gas 162 that flows across the build plane 128. For example, as shown, the inert process gas 162 flows from left to right. The inertization system 160 may include a supply manifold 164 and a return manifold 166. The inert process gas 162 may flow from the supply manifold 164 to the return manifold 166. Fumes in the process chamber 148 may be drawn into the return manifold 166. In some aspects of the disclosure, the supply manifold 164 or the return manifold 166 may be coupled to, or define a portion of, a perimeter wall of the process chamber 148. Additionally, or in the alternative, the supply manifold 164 or the return manifold 166 may be coupled to a housing assembly 168 that contains one or more components of the energy beam system 132, such as one or more irradiation devices 138 and or one or more imaging systems 158. With the supply manifold 164 or the return manifold 166 coupled to the housing assembly 168, a relatively small volume of space between the energy beam system 132 and the powder bed 136 may be inertized, as opposed to inertizing an entire interior of the process chamber 148. Additionally, or in the alternative, a fume plume may have a shorter path to travel before being drawn into the return manifold 166 by the flow of inert process gas 162.

The energy beam system 132 may be positioned at any suitable location within the process chamber 148. Additionally, or in the alternative, the energy beam system 132 may be coupled to a perimeter wall of the process chamber 148. In some aspects of the disclosure, an additive manufacturing machine may include a positioning system 170 configured to move an energy beam system 132 or one or more components thereof relative to the build plane 128. The positioning system 170 may be configured to move the energy beam system 132 or one or more components thereof to specified build coordinates or along specified build vectors corresponding to a cartesian coordinate system in accordance with control commands provided, for example, by the control system 104. The control commands may be provided, for example, to carry out operations of the one or more energy beam system 132 or of the additive manufacturing machine 102 in accordance with the present disclosure. The positioning system 170 may include one or more gantry elements 172 configured to move the energy beam system 132 or one or more components thereof across the powder bed. The gantry elements 172 may respectively be configured to move the energy beam system 132 or one or more components thereof in one or more directions, such as an X-direction, a Y-direction, or a Z-direction. In some aspects of the disclosure, the positioning system 170 may be coupled to the housing assembly 168 that contains one or more components of the energy beam system 132. The housing assembly 168 may be coupled to one or more gantry elements 172 by one or more gantry mounts 174. The positioning system 170 may include a drive motor 176 configured to move the housing assembly 168 or the one or more components the energy beam system 132 according to instructions for the control system 104. The positioning system 170 may include componentry typically associated with a gantry system, such as stepper motors, drive elements, carriages, and so forth.

Figure 2:
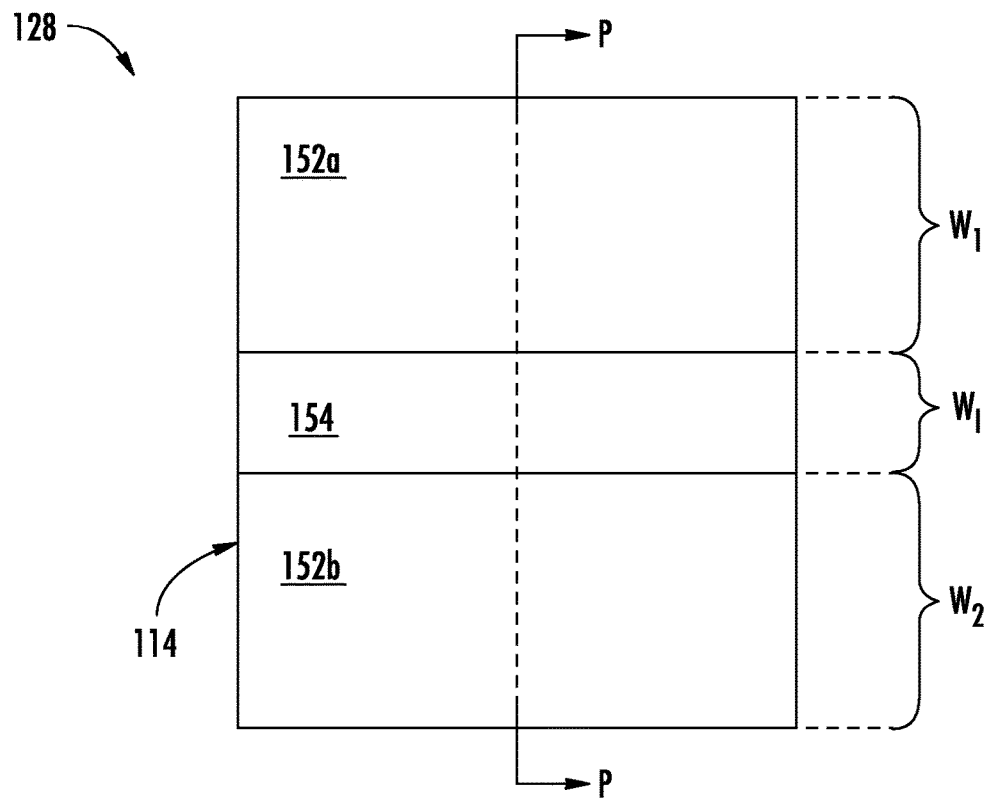
FIG. 2 schematically depicts a build plane in accordance with one or more exemplary aspects of the present disclosure.

Referring now additionally to FIG. 2, a top down view of a build plane 128 is illustrated for forming a layer of the three-dimensional object 114. The three-dimensional object 114 can generally comprise a first build plane region 152a and a second build plane region 152b. The three-dimensional object 114 can further comprise an interlace region 154 between the first build plane region 152a and the second build plane region 152b. In another non-limiting example, the interlace region 154 can include or define an overlapping portion of the first build plane region 152a and the second build plane region 152b.

The first energy beam 134a (illustrated in FIG. 1) can be directed to irradiate the build plane 128 to consolidate build material 118 in at least the first build plane region 152a to form at least a portion of the layer of the three-dimensional object 114. The first build plane region 152a can comprise a variety of shapes, sizes, and locations about the three-dimensional object 114 and can be irradiated using the first energy beam 134a using a variety of scan paths and parameters.

For instance, the first build plane region 152a may comprise an interior portion of the three-dimensional object 114. Additionally, or in the alternative, the first build plane region 152a may comprise an edge of the three-dimensional object 114 or comprise one or more features of the three-dimensional object 114 such as cooling holes, passageways, or the like.

Any suitable scan configuration may be utilized to irradiate the build material 118 within the first build plane region 152a, such as oscillations, hatching, or combinations thereof. For example, the first build plane region 152a may be consolidated by scanning the first energy beam 134a in a plurality of parallel paths, with or without internal oscillations, to consolidate respective areas in the build plane 128 to form a solid portion of the three-dimensional object 114. The specific pattern for consolidating the solid portion may, for example, be manually programmed, computationally derived, or determined via a combination of the two. For instance, a computational algorithm may be employed to determine an efficient scan pattern within the first build plane region 152a based on scan speed, dot size, plume projection, or any other relevant parameters of the additive manufacturing system 100.

The second energy beam 134b (illustrated in FIG. 1) can be directed to irradiate the build plane 128 to consolidate build material 118 in at least the second build plane region 152b to form at least a portion of the layer of the three-dimensional object 114. The second build plane region 152b can comprise a variety of shapes, sizes, and locations about the three-dimensional object 114 and can be irradiated using the second energy beam 134b using a variety of scan paths and parameters.

For instance, the second build plane region 152b may comprise an interior portion of the three-dimensional object 114. Additionally, or in the alternative, the second build plane region 152b may comprise an edge of the three-dimensional object 114 or comprise one or more features of the three-dimensional object 114 such as cooling holes, passageways, or the like.

Similar to the first build plane region 152a, any suitable scan configuration may be utilized to irradiation the build material 118 within the second build plane region 152b, such as oscillations, hatching, or combinations thereof. For example, the second build plane region 152b may be consolidated by scanning the second energy beam 134b in a plurality of parallel paths, with or without internal oscillations, to consolidate respective areas in the build plane 128 to form a solid portion of the three-dimensional object 114. The specific pattern for consolidating the solid portion may, for example, be manually programmed, computationally derived, or determined via a combination of the two. For instance, a computational algorithm may be employed to determine an efficient scan pattern within the second build plane region 152b based on scan speed, dot size, plume projection, or any other relevant parameters of the additive manufacturing system 100.

In some aspects of the disclosure, the scan pattern (e.g., hatching pattern) of the first energy beam 134a in the first build plane region 152a and the scan pattern of the second energy beam 134b in the second build plane region 152b may comprise a substantially similar pattern and potentially be aligned with one another. That is, when the scan patterns are aligned, the first energy beam 134a and the second energy beam 134b combine to form a continuously line between the first build plane region 152a and the second build plane region 152b. For example, the scan pattern for both the first build plane region 152a and the second build plane region 152b may each comprise a plurality of scan paths comprising the same spacing, angle, and vectors. For example, a vector or portion of a pattern of the first energy beam 134a can align with, match, or continue to meet a corresponding vector or portion of a pattern of the second energy beam 134b. Such aspects of the disclosure may promote uniform consolidation of build material 118 in both the first build plane region 152a and the second build plane region 152b to provide a three-dimensional object 114 with more uniform properties and structural characteristics.

While the build plane 128 to be irradiated is exemplary illustrated as having a first build plane region 152a irradiated by a first energy beam 134a and a second build plane region 152b irradiated by a second energy beam 134b, it is appreciated that any number of energy beams 134 may additionally or alternatively be utilized for irradiating the build plane 128 in any number of regions.

Still referring to FIG. 2, the three-dimensional object 114 further comprises an interlace region 154 between the first build plane region 152a and the second build plane region 152b (or any other number of regions irradiated by any number of lasers). The interlace region 154 is consolidated using a combination of the first energy beam 134a and the second energy beam 134b to help promote build quality of the three-dimensional object 114 between the first build plane region 152a and the second build plane regions 152b despite the use of multiple energy beams 134. That is, the disclosure provides for consolidation of build material 118 in the in the interlace region 154 without remelting and without misalignment. As a result, the three-dimensional product 114 will have an accurate build shape and consistent microstructure (and thus mechanical properties) across the transition between the first build plane region 152a and the second build plane region 152b.

In combination, the first build plane region 152a (irradiated by the first energy beam 134a), the second build plane region 152b (irradiated by the second energy beam 134b), and the interlace region 154 (irradiated by both the first energy beam 134a and the second energy beam 134b) can comprise a variety of relative configurations. For instance, as illustrated in FIG. 2, a first width W1 of the first build plane region 152a and a second width W2 of the second build plane region 152b may both be greater than the interlace width WI of the interlace region 154. The relatively smaller interlace width WI of the interlace region 154 can reduce the amount of time where both the first energy beam 134a and the second energy beam 134b are irradiating the same portion of the build plane 128. However, dimensional variations may also be realized within the scope of this disclosure including, for example, where one of the first width W1 of the first build plane region 152a and the second width W2 of the second build plane region 152b is greater than the other, or when the interlace width WI of the interlace region 154 is greater than the first width W1 of the first build plane region 152a or the second width W2 of the second build plane region 152b.

In some aspects of the disclosure, the interlace region 154 may only be melted once. For example, the collective irradiation from multiple energy beams can create a larger melt pool that mitigates or prevents the need for multiple passes by the first energy beam 134a and the second energy beam 134b. Such aspects of the disclosure can promote more uniform material properties within the three-dimensional object 114 by reducing or eliminating excessive temperature fluctuations within the build material 118.

Figure 3:
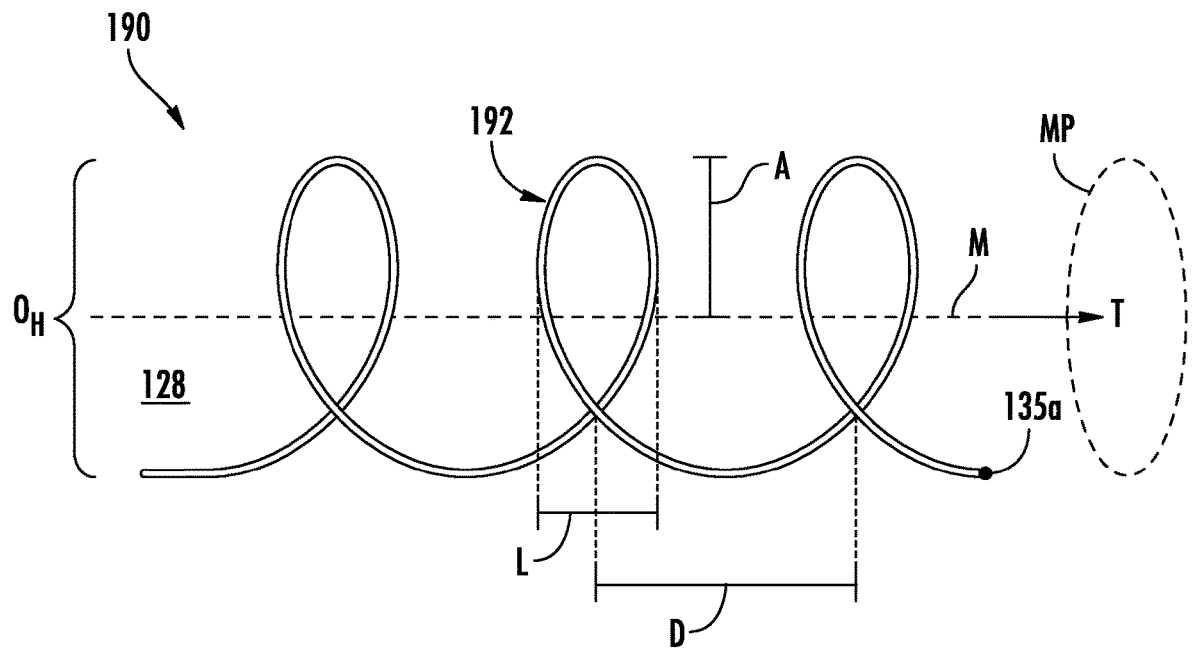
FIG. 3 schematically depicts an oscillation of an energy beam in accordance with one or more exemplary aspects of the present disclosure.
Figure 4:
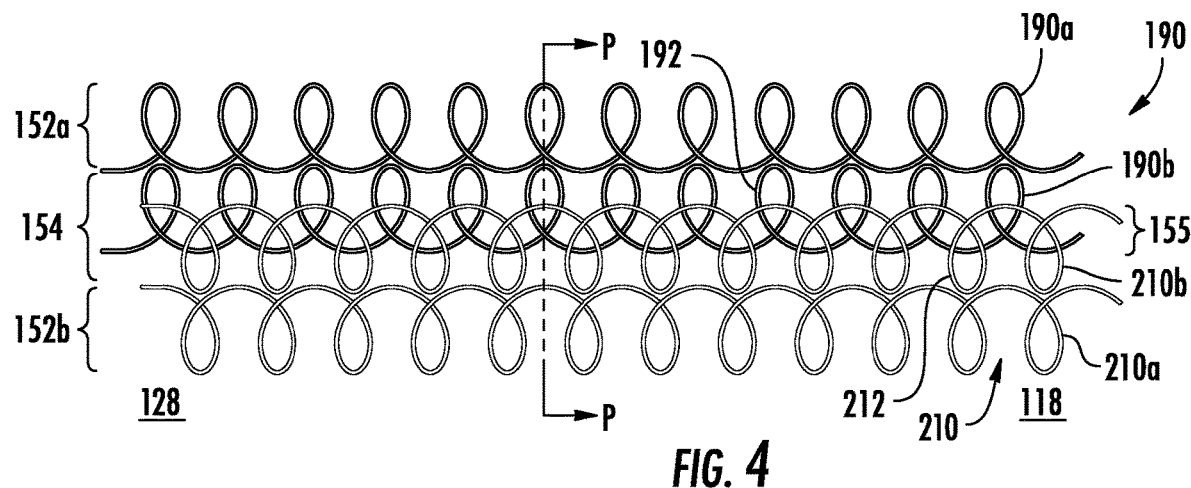
FIG. 4 schematically depicts a build plane in accordance with one or more exemplary aspects of the present disclosure.

Exemplary paths of respective energy beams used for irradiating the first build plane region 152a, the interlace region 154, and the second build plane region 152b as illustrated in FIG. 2 will now be discussed. With reference to FIG. 3, a top down view of an exemplary first oscillating path 190 is illustrated. With reference to FIG. 4, a plurality of paths are illustrated, including the first oscillating path 190 as illustrated in FIG. 3, and a second oscillating path 210, which collectively can be used to irradiate the first build plane region 152a, the interlace region 154, and the second build plane region 152b illustrated in FIG. 2. The first energy beam 134a can travel along a first oscillating path 190 and the second energy beam 134b can travel along a second oscillating path 210, wherein the first oscillating path 190 and the second oscillating path 210 overlap 155.

As best illustrated in FIG. 3, the first oscillating path 190 generally comprises a plurality of oscillations 192 that repeat along a travel direction T. That is, the first spot 135a of the first energy beam 134a can wobble as it travels across the build plane 128 in the travel direction T to produce the plurality of oscillations 192. The wobbling of the first energy beam 134a can allow for a larger melt pool MP in the build plane 128 than if the first spot 135a were to merely travel linearly in parallel with the travel direction T.

The first oscillating path 190 can comprise a variety of parameters and configurations including with respect to the plurality of oscillations 192. For instance, each oscillation 192 may generally comprise an amplitude A and a length L. The amplitude A refers to the maximum distance reached by the first spot 135a extending away from a midline M which bisects the first oscillating path 190 in the travel direction T. The length L refers to the distance extending in the travel direction T of each oscillation 192. Moreover, the first oscillating path 190 can comprise a distance D between oscillations 192.

The amplitude A of each oscillation 192 may impact the size of the overall melt pool MP, which can have a diameter the same as or similar to the overall oscillation height OH. For instance, a greater amplitude can create a greater melt pool MP size which will, in turn, lead to the consolidation of larger amount of build material 118 (FIG. 1) in the build plane 128 from a single pass of the first energy beam 134a. The length L of each oscillation 192 may impact the amount of energy imparted on the build material 118 (FIG. 1) in the build plane 128 from the first energy beam 134a by adjusting the amount of distance travelled by the first spot 135a of the first energy beam 134a over any particular area. A smaller length L can produce a greater travel distance of the first spot 135a over a smaller area along the travel direction T to increase the overall amount of energy imparted on the build material 118 (FIG. 1). Further, the frequency of oscillations 192 in the first oscillating path 190 can be tailored by adjusting the distance D between oscillations 192. A smaller distance D results in oscillations that are more frequent which in turn, similar to a smaller length L, can produce a greater travel distance of the first spot 135a over a smaller area along the travel direction T to increase the overall amount of energy imparted on the build material 118 (FIG. 1). The length L and distance D parameters may be adjusted to any suitable values that produce a suitable melt pool MP in the build plane 128. In some aspects of the disclosure, such as that illustrated in FIG. 3, the oscillations 192 may be separated from one another. However, in some aspects of the disclosure, the length L may be large enough or the distance D may be small enough that the oscillations 192 may partially overlap with one another along the travel direction T.

In some aspects of the disclosure, the amplitude A, length L, and distance D for each oscillation 192 can each remain constant along the first oscillating path 190. However, in some aspects of the disclosure, one or more of the amplitude A, length L, and distance D can independently vary along the first oscillating path 190 within oscillations 192. For example, the amplitude A may increase for certain oscillations over a certain distance to temporarily grow the size of the melt pool MP with respect to the first oscillating path 190.

The oscillations 192 may comprise a variety of configurations. In some aspects of the disclosure, such as that illustrated in FIG. 3, the oscillations 192 may comprise symmetrical loops. In some aspects of the disclosure, one or more of the oscillations 192 may additionally or alternatively comprise other configurations, such as asymmetrical loops, linear or non-linear patterns, or combinations thereof. Moreover, while the travel direction T is illustrated as comprising a relatively linear path, it is appreciated that the travel direction T may additionally, or alternatively, comprise one or more non-linear portions such as bends, curves, turns, or the like.

While reference in FIG. 3 is made to the first oscillating path 190, it is appreciated that this is merely exemplary and that the second oscillating path 210 (FIG. 4) can similarly be characterized with the same dimensional parameters and configurations. Furthermore, the dimensional parameters and configurations of the first oscillating path 190 and the second oscillating path may be similar to one another, dissimilar to one another, or a combination thereof.

With reference to FIG. 4, the first oscillating path 190 of the first energy beam 134a and the second oscillating path 210 of the second energy beam 134b may thereby combine and overlap 155 to irradiate the interlace region 154, as explained with respect to FIG. 2. The overlap 155 can also be referred to as a predefined overlap 155 and refers to a predefined portion of the build plane 128 where both the first energy beam 134a and second energy beam 134b irradiate the same build material 118, whether simultaneously, sequentially, or combinations thereof.

The interlace region 154 is disposed between the first build plane region 152a, which is irradiated from separate passes of the first energy beam 134a, and the second build plane region 152b, which is irradiated from separate passes of the second energy beam 134b. For instance, the first build plane region 152a can be irradiated by a first pass 190a of the first energy beam 134a. The second build plane region 152b can be irradiated by a first pass 210a of the second energy beam 134b. The interlace region 154 can be irradiated by both a second pass 190b of the first energy beam 134a and a second pass 210b of the second energy beam 134b. The separate passes of the first energy beam 134a and the second energy beam 134b for the first build plane region 152a and the second build plane region 152b, respectively, may similarly comprise a plurality of oscillations 192, 212 (as illustrated), linear hatching, or combinations or variations thereof.

Figure 5:
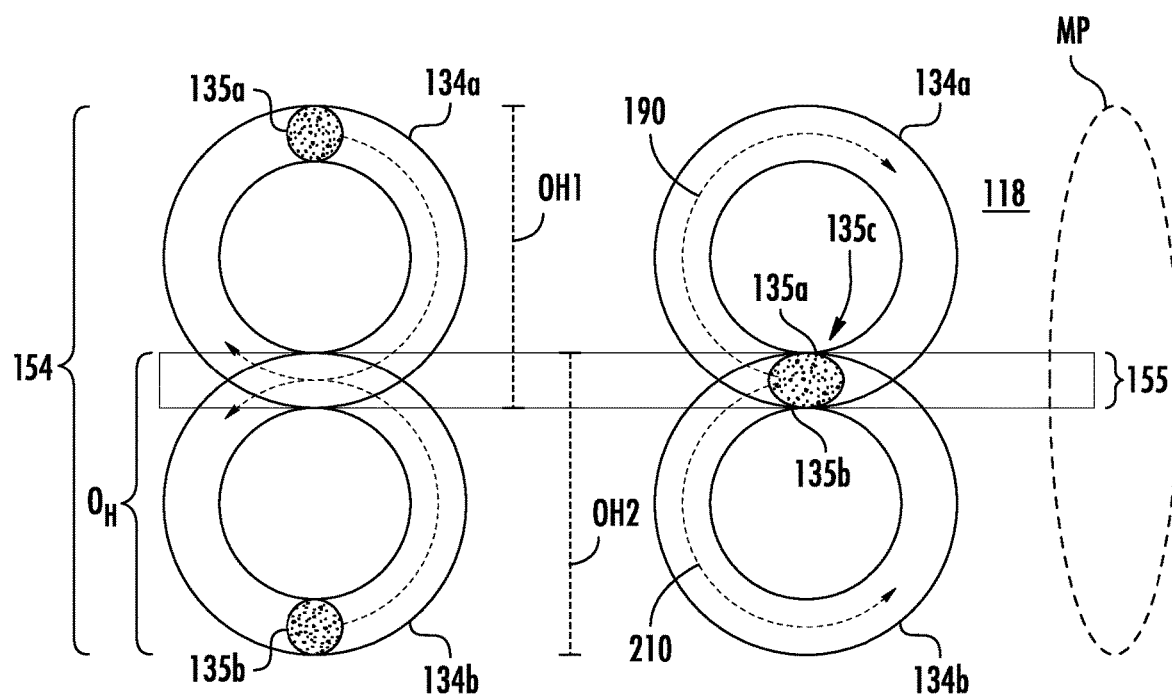
FIG. 5 schematically depicts an interlace region of a build plane in accordance with one or more exemplary aspects of the present disclosure.

FIG. 5 illustrates the first oscillating path 190 and the second oscillating path 210 having an overlap 155 in the interlace region 154, wherein the overlap occurs only at the peak of the oscillations such that respective oscillations touch, but do not further overlap with one another (such as illustrated in FIG. 4). By at least partially overlapping the first oscillating path 190 and the second oscillating path 210, the interlace region 154 may be irradiated and consolidated in a more efficient manner and mitigate potential misalignment between the first energy beam 134a and the second energy beam 134b, such as by forming a larger common melt pool MP in the build material 118. The larger melt pool MP formed by both the first energy beam 134a and second energy beam 134b avoids having to respective melt pools come together at a meeting location were both the first energy beam 134a and the second energy beam 134b form distinct melt pools in the interlace region 154. Thus, misalignment caused by laser drift can be avoided, or at least mitigated, to produce the three-dimensional product 114 with an accurate build shape across the transition between the first build plane region 152a and the second build plane region 152b. Moreover, combining the first energy beam 134a and the second energy beam 134b via the overlap 155 allows for the size of the melt pool MP to be increased compared to if only a single of the first energy beam 134a or second energy beam 134b created the melt pool MP.

The overlap 155 can comprise a variety of relative dimensions within the interlace region 154. For example, in some aspects of the disclosure, such as that illustrated in FIG. 5, the overlap 155 may be smaller and may only comprise the size of the first spot 135a of the first energy beam 134a and the second spot 135b of the second energy beam 134b. That is, the first spot 135a and the second spot 135b may irradiate build material at a merged location 135c, but neither of the first spot 135a nor the second spot 135b extend further into the oscillation of the other energy beam.

Thus, the overlap 155 may be smaller, such as when the first spot 135a and the second spot 135b only overlap at the merged location 135c on the same area of build material 118. In such embodiments, the first spot 135a has a first oscillation height OH1 and the second spot 135b has a second oscillation height OH2. The first oscillation height OH1 may thereby partially overlap with into a second oscillation height OH2, such as at their respective peaks as illustrated.

However, as discussed above and illustrated in FIG. 4, in some aspects of the disclosure, the overlap 155 may be larger, such as were the first spot 135a or the second spot 135b (illustrated in FIG. 5) to move farther into the first oscillating path 190 or the second oscillating path 210, respectively. For instance, the first spot 135a of the first energy beam 134a may travel further into the interlace region 154 towards the second build plane region 152b. Alternatively, the respective oscillations may have greater overlap such as that illustrated in FIG. 4.

Figure 6:
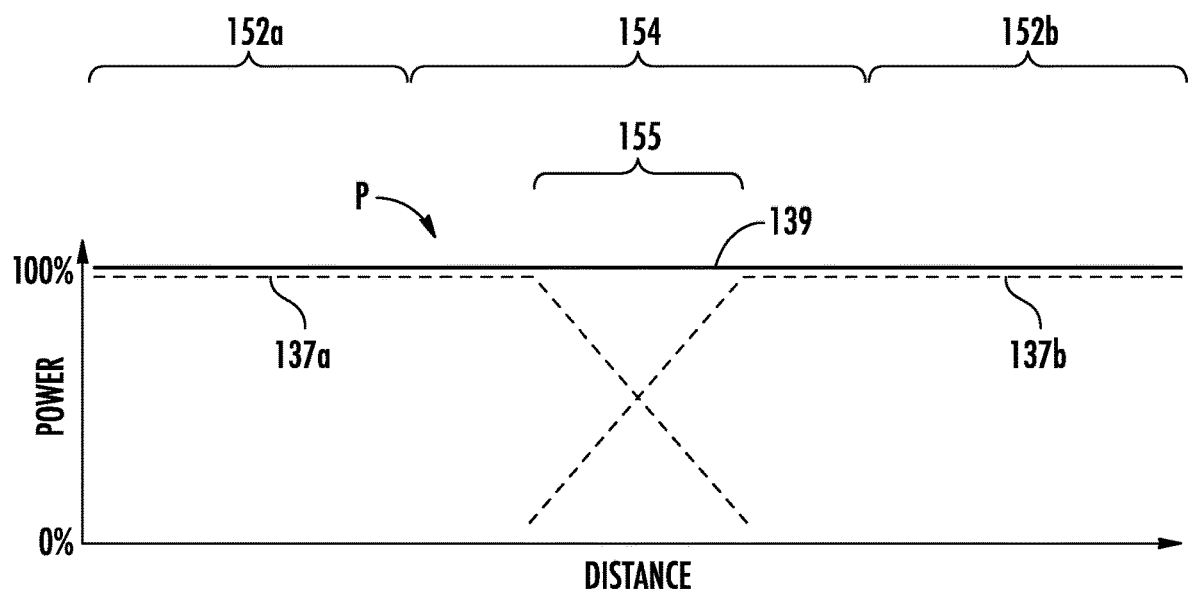
FIG. 6 schematically depicts a power profile of multiple energy beams in accordance with one or more exemplary aspects of the present disclosure.

With additional reference to FIG. 6, a power profile P of the first energy beam 134a and the second energy beam 134b is illustrated. The power profile P in FIG. 6 corresponds to the amount of irradiation power provided by the first energy beam 134a and the second energy beam 134b with respect to the cross sectional transition (illustrated in FIGS. 2 and 4) from the first build plane region 152a, to the interlace region 154, and to the second build plane region 152b. The power profile P refers to the amount of energy imparted on the build material 118 from the first energy beam 134a and the second energy beam 134b.

The power profile P of the first energy beam 134a, i.e., the first power 137a, and the power profile P of the second energy beam 134b, i.e., the second power 137b, can be adjusted in the interlace region 154, and in particular, in the overlap 155. By adjusting the power profile P of the first energy beam 134a and the second energy beam 134b, the net power 139 (defined by the summation of the first power 137a from the first energy beam 134a and the second power 137b from the second energy beam 134b at any point where the first oscillating path 190 and the second oscillating path 210 overlap) directed upon a particular location of build material 118 can be controlled. It is appreciated that net power 139 is illustrated in FIG. 6 as having a slight offset from the peak power P of the first power 137a and the second power 137b. However, this offset is merely for illustrative purposes to visualize the different power profiles.

It is appreciated that, when only one energy beam is present (e.g., in the first build plane region 152a and in the second build plane region 152b), then the net power 139 would be equal to the first power 137a or the second power 137b, respectively. In turn, irradiation of the three-dimensional object 114 in the overlap 155 can become smooth and balanced despite irradiation by both the first energy beam 134a and the second energy beam 134b.

While the power profile P presented in FIG. 6 is illustrated as linear transitions, it is appreciated that other changes in the power profile P may also be utilized. For instance, one or both of the first power 137a and the second power 137b can decrease or increase in power using alternative ramping configurations, such as, but not limited to, step profiles, logarithmic profiles, or undulating profiles.

To assist in controlling the net power 139, the first energy beam 134a and the second energy beam 134b can be synchronized with one another such that the relative locations of the first spot 135a and the second spot 135b are coordinated with one another. The synchronization of the first energy beam 134a and the second energy beam 134b thereby allows for the first power 137a from the first energy beam 134a and the second power 137b from the second energy beam 134b to be controlled based on the locations of the first spot 135a and the second spot 135b. More specifically, the known time, location, and power of one of the first spot 135a and the second spot 135b is coordinated with the time, location, and power of the other of the first spot 135a and the second spot 135b to produce the targeted net power 139 at a given time and location in the build plane 128.

In some aspects of the disclosure, the first power 137a of the first energy beam 134a or the second power 137b of the second energy beam 134b may decrease in the interlace region 154, and in particular, in the overlap 155. For example, the first power 137a of the first energy beam 134a may have a full power, or nearly full power, in the portion of the interlace region 154 adjacent to the first build plane region 152a. However, as the first oscillating path 190 extends further into the interlace region 154 and into the overlap 155, the first power 137a can decrease. That is, the first power 137a can decrease to account for the second power 137b imparted by the second energy beam 134b. The first power 137a can decrease to near zero percent at the same location where the second energy beam 134b starts to overlap with the first energy beam 134a, such that the second energy beam 134b would be entering the location at full, or nearly full, power. Alternatively, or additionally, the second power 137b of the second energy beam 134b may have a full power, or nearly full power, in the portion of the interlace region 154 adjacent to the second build plane region 152b. However, as the second oscillating path 210 extends further into the interlace region 154 and into the overlap 155, the second power 137b can decrease. That is, the second power 137b can decrease to account for the first power 137a imparted by the first energy beam 134a. The second power 137b can decrease to near zero percent at the same location where the first energy beam 134a starts to overlap with the second energy beam 134b, such that the first energy beam 134a would be entering the location at full, or nearly full, power. Thus, as exemplarily illustrated in FIG. 6, the first power 137a and the second power 137b may respectively taper as the first energy beam 134a and the second energy beam 134b extend further into the overlap 155 within the interlace region 154. Such embodiments can promote a smoother transition between the first build plane region 152a and the second build plane region 152b by avoiding excessive irradiation (e.g., if both the first energy beam 134a and the second energy beam 134b were both irradiating the same area at full power).

Where the first oscillating path 190 and the second oscillating path 210 overlap 155 in the interlace region 154, the first power 137a of the first energy beam 134a and the second power 137b of the second energy beam 134b combine to impart a net power 139 on the build material 118 (i.e., the sum of the first power 137a and the second power 137b at a point on the build material 118). The first power 137a of the first energy beam 134a or the second power 137b of the second energy beam 134b may be adjusted to control the net power 139. For example, the net power 139 may be controlled by decreasing the first power 137a of the first energy beam 134a based on the second power 137b of the second energy beam 134b or the second power 137b of the second energy beam 134b may be decreased based on the first power 137a of the first energy beam 134a. Thus, the first power 137a of the first energy beam 134a and the second power 137b of the second energy beam 134b can be modulated in synchronicity within their own oscillatory motions and with respect to one another. In other words, the first power 137a and the second power 137b will increase and decrease with respect to the relative position of the first spot 135a and second spot 135b in a given oscillation 192 and a given location in the interlace region 154 to produce a sufficient net power 139 (from the sum of the first power 137a and the second power 137b at an individual location).

In some aspects of the disclosure, the net power 139 may be substantially constant throughout the interlace region 154. That is, the net power 139 in the overlap 155 where both the first energy beam 134a and the second energy beam 134b are simultaneously present may be the same as elsewhere in the interlace region 154 where just one of the first energy beam 134a and the second energy beam 134b are present.

In some aspects of the disclosure, the net power 139 may never exceed the power of the first power 137a of the first energy beam 134a or the second power 137b of the second energy beam 134b. For example, where both the first energy beam 134a and the second energy beam 134b are present, the first power 137a or the second power 137b may be reduced such that their combination never exceeds the original of the first power 137 where just the first energy beam 134a is present on one side of the interlace region 154 or where just the second energy beam 134b is present on the other side of the interlace region 154. In even some aspects of the disclosure, the net power 139 may be equal to the first power 137a used by the first energy beam 134a for irradiating the first build plane region 152a or the second power 137b used by the second energy beam 134b for irradiating the second build plane region 152b.

It is appreciated that while certain variations and permutations are presented herein with respect to the first energy beam 134a, the first power 137a, and the first oscillating path 190, in addition to the second energy beam 134b, the second power 137b, and the second oscillating path 210, these examples are not intended to be exclusive and other implementations may further be realized within the scope of this disclosure. Further, while exemplary illustration is made to the first energy beam 134a and the second energy beam 134b, it is appreciated that any number of energy beams 134 may additionally or alternatively be utilized for irradiating the build plane 128 in any number of regions.

Figure 7:
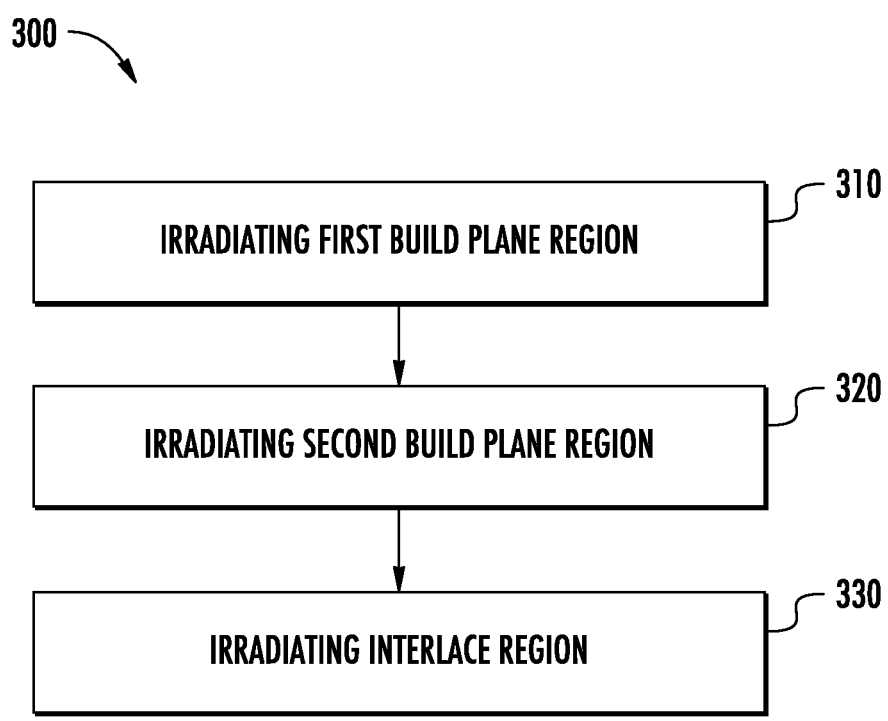
FIG. 7 schematically depicts an exemplary method of additively manufacturing a three-dimensional object in accordance with one or more exemplary aspects of the present disclosure.

Referring now additionally to FIG. 7, a method 300 is illustrated for additively manufacturing a three-dimensional object 114. The method 300 generally comprises irradiating the first build plane region 152a using the first energy beam 134a in step 310 and irradiating the second build plane region 152b using the second energy beam 134b in step 320. The second build plane region 152b may be irradiated before irradiation of the first build plane region 152a, after irradiation of the first build plane region 152a, during irradiation of the first build plane region 152a, or combinations thereof. Such embodiments, such as those where the first build plane region 152a and the second build plane region are irradiated along the first oscillating path 190 and the second oscillating path 210 at the same time, can provide for faster build times and higher throughput.

The first build plane region 152a and the second build plane region 152b may be irradiated at the same time or in any respective order.

The method 300 further comprises irradiating the interlace region 154 between the first build plane region 153a and the second build plane region 153b by directing the first energy beam 134a along the first oscillating path 190 and directing the second energy beam 134b along the second oscillating path 210 in step 330. The first oscillating path 190 and the second oscillating path 210 simultaneously or sequentially overlap 155 to provide an overall smooth and consistent transition between the first build plane region 153a and the second build plane region 153b.

As discussed above, the first energy beam 134a, the first power 137a, and the first oscillating path 190, in addition to the second energy beam 134b, the second power 137b, and the second oscillating path 210, may comprise a variety of relative parameters and configurations. For example, the first power 137a of the first energy beam 134a and a second power 137b of the second energy beam 134b may be adjusted when the first oscillating path 190 and the second oscillating path 210 overlap. In some aspects of the disclosure, the first power 137a decreases as the first oscillating path 190 extends further into the interlace region 154 towards the second build plane region 152b. Likewise, in some aspects of the disclosure, the second power 137b decreases as the second oscillating path 210 extends further into the interlace region 154 towards the first build plane region 152b.

In some aspects of the disclosure, the net power 139 of the first power 137a of the first energy beam 134a and a second power 137b of the second energy beam 134b at any point where the first oscillating path 190 and the second oscillating path 210 overlap 155 does not exceed the first power 137a used by the first energy beam 134a for irradiating the first build plane region 152a or the second power 137b used by the second energy beam 134b for irradiating the second build plane region 152b. Additionally, or in the alternative, a net power 139 of the first power 137a of the first energy beam 134a and the second power 137b of the second energy beam 134b may be substantially constant throughout the interlace region 154 when the first oscillating path 190 and the second oscillating path 210 overlap 155. For example, the net power 139 in the interlace region 154 may be substantially equal to the first power 137a used by the first energy beam 134a for irradiating the first build plane region 152a and the second power 137b used by the second energy beam 134b for irradiating the second build plane region 152b.

In some aspects of the disclosure, the first energy beam 134a may irradiate along the first oscillating path 190 and the second energy beam 134b may irradiate along the second oscillating path 210 at the same time. For example, the first energy beam 134a and the second energy beam 134b may create a common melt pool in the interlace region 154. Alternatively, or additionally, the build material 118 in the interlace region 154 may only be melted once.

Furthermore, in some aspects of the disclosure, a simultaneous overlap 155 of the first energy beam 134a and the second energy beam 134b may be less than or equal to a diameter of a first spot 135a of the first energy beam 134a or a second spot 135b of the second energy beam 134b.

Figure 8:
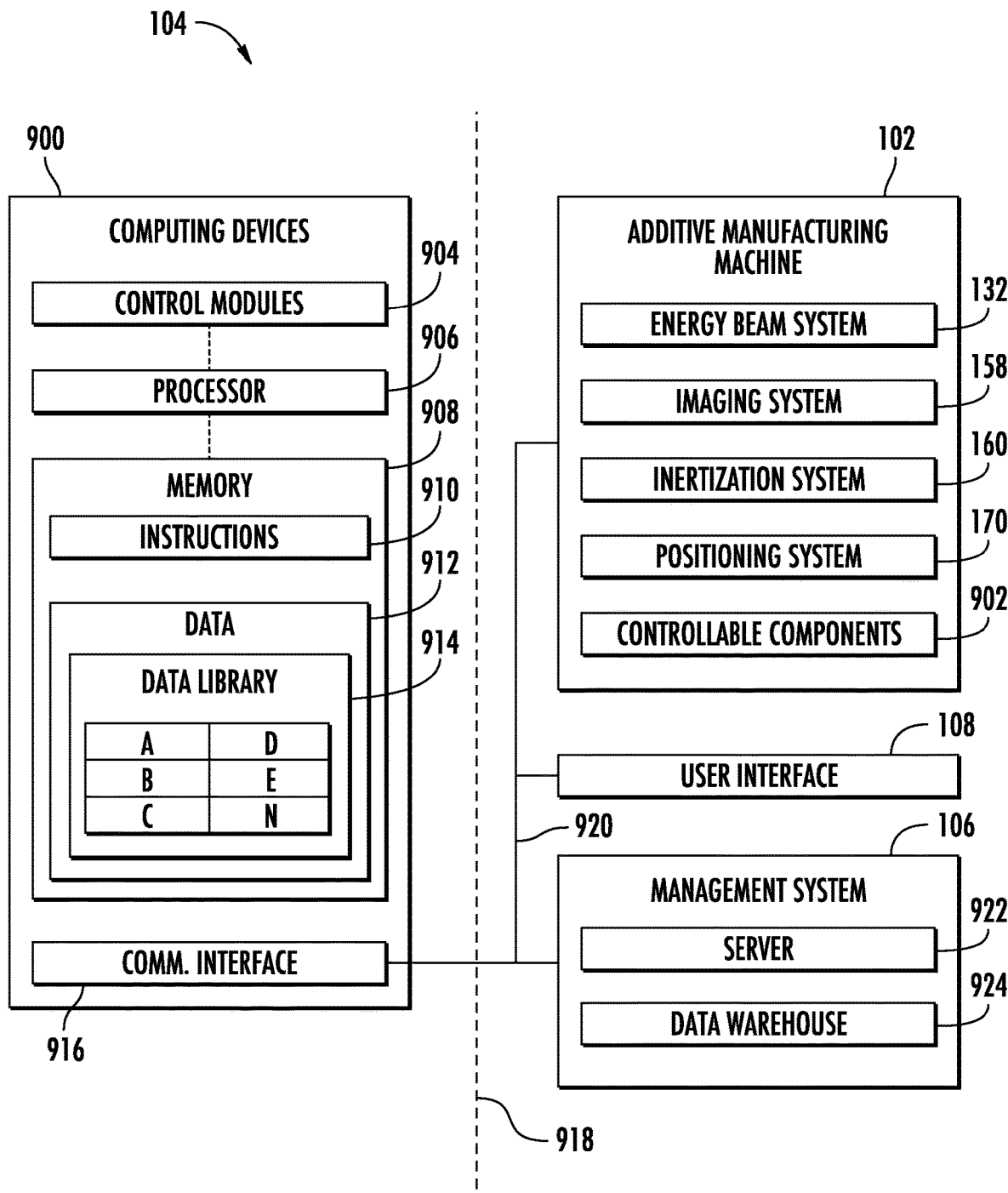
FIG. 8 schematically depicts an exemplary controls system that may be configured to control an additive manufacturing system or machine in accordance with one or more exemplary aspects of the present disclosure.

Now turning to FIG. 8, a control system 104 is illustrated. The control system 104 may be configured to perform one or more control operations associated with an additive manufacturing system 100 or an additive manufacturing machine 102. The control operations may include one or more parts of method 300 disclosed herein, or one or more operations to otherwise consolidate the three-dimensional object 114 in accordance with the disclosure presented herein.

For example, the control operations can include irradiating the first build plane region 152a using the first energy beam 134a and irradiating the second build plane region 152b using the second energy beam 134b. As discussed above, the first build plane region 152a and the second build plane region 152b may be irradiated at the same time or in any respective order. The control operations can further include irradiating the interlace region 154 between the first build plane region 153a and the second build plane region 153b using the first energy beam 134a travelling along the first oscillating path 190 and the second energy beam 134b travelling the second oscillating path 210. The first oscillating path 190 and the second oscillating path 210 can overlap 155 to promote an overall smooth and consistent transition between the first build plane region 153a and the second build plane region 153b.

As shown in FIG. 8, a control system 104 may include one or more computing devices 900. The one or more computing devices 900 may be communicatively coupled with an additive manufacturing machine 102 or additive manufacturing system 100. For example, a computing device 900 may be communicatively coupled with one or more controllable components 902 of an additive manufacturing machine 102, such as one or more controllable components 902 associated with an energy beam system 132, an imaging system 158, an inertization system 160, or a positioning system 170. Additionally, or in the alternative, a computing device 900 may be communicatively coupled with a management system 106 or a user interface 108. The one or more computing devices 900 may be located locally or remotely relative to an additive manufacturing machine 102.

The one or more computing devices 900 may include one or more control modules 904 configured to cause the computing device 900 to perform one or more control operations. The one or more control modules 904 may include one or more irradiation control modules 800. The one or more control modules 904 may include control logic executable to provide control commands configured to control the one or more controllable components 902 associated with an additive manufacturing machine 102.

The one or more computing devices 900 may include one or more processors 906 and one or more memory devices 908. The one or more processors 906 may include any suitable processing device, such as a microprocessor, microcontroller, integrated circuit, logic device, or other suitable processing device. The one or more memory devices 908 may include one or more computer-readable media, including but not limited to non-transitory computer-readable media, RAM, ROM, hard drives, flash drives, or other memory devices 908. The one or more control modules 904 may be implemented at least in part by the one or more processors 906 or the one or more memory devices 908.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 908 may include, but is not limited to, a non-transitory computer-readable medium, such as a random-access memory (RAM), and computer-readable nonvolatile media, such as hard drives, flash memory, and other memory devices. Alternatively, a floppy disk, a compact disc-read only memory (CD-ROM), a magneto-optical disk (MOD), or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 908 may store information accessible by the one or more processors 906, including computer-executable instructions 910 that can be executed by the one or more processors 906. The computer-executable instructions 910 may include any set of instructions which when executed by the one or more processors 906 cause the one or more processors 906 to perform operations, including calibration operations, or additive manufacturing operations. For example, the computer-executable instructions 910 may be configured to cause the one or more processors 906 to perform one or more of the steps presented in method 300 (FIG. 7) or otherwise presented in this disclosure. In some aspects of the disclosure, the computer-executable instructions 910 may be configured to cause the one or more processors 906 to irradiate the first build plane region 152a using the first energy beam 134a and irradiate the second build plane region 152b using the second energy beam 134b. As discussed above, the first build plane region 152a and the second build plane region 152b may be irradiated at the same time or in any respective order. The computer-executable instructions 910 can further cause the one or more processors 906 to irradiate the interlace region 154 between the first build plane region 153a and the second build plane region 153b using the first energy beam 134a travelling along the first oscillating path 190 and the second energy beam 134b travelling the second oscillating path 210. The first oscillating path 190 and the second oscillating path 210 can overlap 155 to promote an overall smooth and consistent transition between the first build plane region 153a and the second build plane region 153b.

The memory devices 908 may store a plurality of data 912 accessible by the one or more processors 906. The data 912 may be past, current, real-time, or a combination thereof. The data 912 may be stored in a data library 914. As examples, the data 912 may include data 912 associated with or generated by an additive manufacturing system 100 or an additive manufacturing machine 102, including data 912 associated with or generated by a computing device 900, an additive manufacturing machine 102, a management system 106, or a user interface 108. The data 912 may also include other data sets, parameters, outputs, information, associated with an additive manufacturing system 100 or an additive manufacturing machine 102.

The one or more computing devices 900 may also include a communication interface 916 configured to communicate with various nodes on a communication network 918 via communication lines 920 that are wired or wireless. The communication interface 916 may include any suitable components for interfacing with one or more network(s), including for example, transmitters, receivers, ports, controllers, antennas, or other suitable components. The communication interface 916 may allow the one or more computing devices 900 to communicate with various nodes associated with the additive manufacturing machine 102, the management system 106, or a user interface 108. The communication network 918 may include, for example, a local area network (LAN), a wide area network (WAN), satellite communication (SATCOM) network, very high frequency (VHF) network, a high frequency (HF) network, a wireless fidelity (Wi-Fi) network, a worldwide interoperability for microwave access (WiMAX) network, a gatelink network, or any other communication network 918 for transmitting messages to or from the computing device 900 across the communication lines 920. The communication lines 920 of communication network 918 may include a data bus or a combination of wired or wireless communication links.

The management system 106 may include a server 922 or a data warehouse 924. As an example, at least a portion of the data 912 may be stored in the data warehouse 924, and the server 922 may be configured to transmit data 912 from the data warehouse 924 to the one or more computing device 900, or to receive data 912 from the one or more computing devices 900 and to store the received data 912 in the data warehouse 924 for further purposes. The server 922 or the data warehouse 924 may be implemented as part of the one or more computing devices 900 or as part of the management system 106.

While computer devices 900 and components thereof have been disclosed herein, it is appreciated that these specific aspects of the disclosure are not intended to be limiting and alternatives may further be realized within the scope of this disclosure.

It should now be appreciated that additive manufacturing systems and methods disclosed herein can assist in the proper alignment of energy beams to promote a smooth and consistent transition between a first build plane region 152a abuts a second build plane region 152b as they are consolidated using a first energy beam 134a and a second energy beam 134b, respectively. By providing an interlace region 154 between the first build plane region 152a and the second build plane region 152b, one or more parameters of the first energy beam 134a or the second energy beam 14b can be adjusted to mitigate or avoid excessive irradiation and hard stopping points within the build material 118.

Further aspects of the presently disclosed subject matter are provided by the following clauses:

A method of additively manufacturing a three-dimensional object the method comprising, irradiating a first build plane region using a first energy beam; irradiating a second build plane region using a second energy beam; and irradiating an interlace region between the first build plane region and the second build plane region, wherein irradiating the interlace region comprises directing the first energy beam along a first oscillating path; and directing the second energy beam along a second oscillating path intersecting and overlapping with the first oscillating path.

The method of any clause herein, wherein a first power of the first energy beam and a second power of the second energy beam are adjusted when the first oscillating path and the second oscillating path overlap.

The method of any clause herein, wherein the first power decreases as the first oscillating path extends further into the interlace region towards the second build plane region.

The method of any clause herein, wherein the second power decreases as the second oscillating path extends further into the interlace region towards the first build plane region.

The method of any clause herein, wherein a net power, defined by a summation of a first power of the first energy beam and a second power of the second energy beam at any point where the first oscillating path and the second oscillating path overlap, does not exceed the first power used by the first energy beam irradiating the first build plane region or the second power used by the second energy beam irradiating the second build plane region.

The method of any clause herein, wherein a net power, defined by a summation of a first power of the first energy beam and a second power of the second energy beam, is constant throughout the interlace region when the first oscillating path and the second oscillating path overlap.

The method of any clause herein, wherein the net power in the interlace region is equal to the first power used by the first energy beam irradiating the first build plane region and the second power used by the second energy beam irradiating the second build plane region.

The method of any clause herein, wherein the first energy beam irradiates along the first oscillating path and the second energy beam irradiates along the second oscillating path at a same time.

The method of any clause herein, wherein the first energy beam and the second energy beam create a common melt pool in the interlace region.

The method of any clause herein, wherein a build material in the interlace region is only melted once.

The method of any clause herein, wherein an overlap of the first energy beam and the second energy beam is less than or equal to a diameter of a first spot of the first energy beam or a second spot of the second energy beam.

The method of any clause herein, wherein the first energy beam travelling the first oscillating path overlaps simultaneously with the second energy beam travelling the first oscillating path at an overlap.

An additive manufacturing system for additively manufacturing a three-dimensional object, the additive manufacturing system comprising a first irradiation device configured to generate a first energy beam; a second irradiation device configured to generate a second energy beam; a control system configured to perform one or more control operations associated with the additive manufacturing system, wherein the one or more control operations comprise irradiating a first build plane region using the first energy beam; irradiating a second build plane region using the second energy beam; and irradiating an interlace region between the first build plane region and the second build plane region, wherein irradiating the interlace region comprises directing the first energy beam along a first oscillating path; and directing the second energy beam a second oscillating path overlapping with the first oscillating path.

The additive manufacturing system of any clause herein, wherein a first power of the first energy beam and a second power of the second energy beam are adjusted when the first oscillating path and the second oscillating path overlap.

The additive manufacturing system of any clause herein, wherein the first power decreases as the first oscillating path extends further into the interlace region towards the second build plane region.

The additive manufacturing system of any clause herein, wherein the second power decreases as the second oscillating path extends further into the interlace region towards the first build plane region.

The additive manufacturing system of any clause herein, wherein a net power, defined by a summation of a first power of the first energy beam and a second power of the second energy beam at any point where the first oscillating path and the second oscillating path overlap, does not exceed the first power used by the first energy beam irradiating the first build plane region or the second power used by the second energy beam irradiating the second build plane region.

A three-dimensional object manufactured by a method comprising irradiating a first build plane region using a first energy beam; irradiating a second build plane region using a second energy beam; and irradiating an interlace region between the first build plane region and the second build plane region, wherein irradiating the interlace region comprises directing the first energy beam along a first oscillating path; and directing the second energy beam along a second oscillating path overlapping with the first oscillating path.

The three-dimensional object of any clause herein, wherein a first power of the first energy beam and a second power of the second energy beam are adjusted when the first oscillating path and the second oscillating path overlap.

The three-dimensional object of any clause herein, wherein the first power decreases as the first oscillating path extends further into the interlace region towards the second build plane region.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method of additively manufacturing a three-dimensional object, the method comprising:
   irradiating a first build plane region using a first energy beam;
   irradiating a second build plane region using a second energy beam; and irradiating an interlace region between the first build plane region and the second build plane region, wherein irradiating the interlace region comprises:
  directing the first energy beam along a first oscillating path; and
  directing the second energy beam along a second oscillating path intersecting and overlapping with the first oscillating path, the first and second oscillating paths comprising a plurality of oscillations formed by wobbling the first energy beam in a first direction and wobbling the second energy beam in a second, opposite direction, wherein, when the first oscillating path and the second oscillating path overlap in an overlap region within the interlace region, a first power of the first energy beam and a second power of the second energy beam are adjusted to maintain a net power in the overlap region that is equal to a net power elsewhere in the interlace region where just one of the first energy beam and the second energy beam are present, and
  wherein the first power of the first energy beam and the second power of the second energy beam are modulated in synchronicity within their own oscillatory motions and with respect to one another.

2. The method of claim 1, wherein the first power decreases as the first oscillating path extends further into the interlace region towards the second build plane region.

3. The method of claim 2, wherein the second power decreases as the second oscillating path extends further into the interlace region towards the first build plane region.

4. The method of claim 1, wherein a net power, defined by a summation of a first power of the first energy beam and a second power of the second energy beam at any point where the first oscillating path and the second oscillating path overlap, does not exceed the first power used by the first energy beam irradiating the first build plane region or the second power used by the second energy beam irradiating the second build plane region.

5. The method of claim 1, wherein a net power, defined by a summation of a first power of the first energy beam and a second power of the second energy beam, is constant throughout the interlace region when the first oscillating path and the second oscillating path overlap.

6. The method of claim 5, wherein the net power in the interlace region is equal to the first power used by the first energy beam irradiating the first build plane region and the second power used by the second energy beam irradiating the second build plane region.

7. The method of claim 1, wherein the first energy beam irradiates along the first oscillating path and the second energy beam irradiates along the second oscillating path at a same time.

8. The method of claim 7, wherein the first energy beam and the second energy beam create a common melt pool in the interlace region.

9. The method of claim 8, wherein a build material in the interlace region is only melted once.

10. The method of claim 1, wherein the overlap of the first energy beam and the second energy beam is less than or equal to a diameter of a first spot of the first energy beam or a second spot of the second energy beam.

11. The method of claim 1, wherein the first energy beam travelling the first oscillating path overlaps simultaneously with the second energy beam travelling the second oscillating path in the overlap region.

12. The method of claim 1, wherein the plurality of oscillations comprises a plurality of loops.

13. The method of claim 1, wherein the plurality of oscillations of the first oscillating path are offset from the plurality of oscillations of the second oscillating path relative to a travel direction.

14. An additive manufacturing system for additively manufacturing a three-dimensional object, the additive manufacturing system comprising:
  a first irradiation device configured to generate a first energy beam;
  a second irradiation device configured to generate a second energy beam;
  a control system configured to perform one or more control operations associated with the additive manufacturing system, wherein the one or more control operations comprise:
    irradiating a first build plane region using the first energy beam;
    irradiating a second build plane region using the second energy beam; and
    irradiating an interlace region between the first build plane region and the second build plane region, wherein irradiating the interlace region comprises:
      directing the first energy beam along a first oscillating path; and
      directing the second energy beam a second oscillating path overlapping with the first oscillating path, the first and second oscillating paths comprising a plurality of oscillations formed by wobbling the first energy beam in a first direction and wobbling the second energy beam in a second, opposite direction, wherein, when the first oscillating path and the second oscillating path overlap in an overlap region within the interlace region, a first power of the first energy beam and a second power of the second energy beam are adjusted to maintain a net power in the overlap region that is equal to a net power elsewhere in the interlace region where just one of the first energy beam and the second energy beam are present, and
      wherein the first power of the first energy beam and the second power of the second energy beam are modulated in synchronicity within their own oscillatory motions and with respect to one another.

15. The additive manufacturing system of claim 14, wherein the first power decreases as the first oscillating path extends further into the interlace region towards the second build plane region.

16. The additive manufacturing system of claim 15, wherein the second power decreases as the second oscillating path extends further into the interlace region towards the first build plane region.

17. The additive manufacturing system of claim 14, wherein a net power, defined by a summation of a first power of the first energy beam and a second power of the second energy beam at any point where the first oscillating path and the second oscillating path overlap, does not exceed the first power used by the first energy beam irradiating the first build plane region or the second power used by the second energy beam irradiating the second build plane region.

* * * * *